(12) United States Patent
Langdon (10) Patent No.: US 9,058,689 B2
(45) Date of Patent: Jun. 16, 2015

(54) SPATIAL PREDICTIVE APPROXIMATION AND RADIAL CONVOLUTION

(75) Inventor: Simon Langdon, Victoria (AU)

(73) Assignee: EYEFI PTY LTD, Victoria (AU)

( * ) Notice: Subject to any disclaimer, the term of this patent is extended or adjusted under 35 U.S.C. 154(b) by 1073 days.

(21) Appl. No.: 12/997,648

(22) PCT Filed: Jun. 16, 2009

(86) PCT No.: PCT/AU2009/000769
§ 371 (c)(1),
(2), (4) Date: Jan. 11, 2011

(87) PCT Pub. No.: WO2009/152567
PCT Pub. Date: Dec. 23, 2009

(65) Prior Publication Data
US 2011/0102580 A1    May 5, 2011

(30) Foreign Application Priority Data
Jun. 16, 2008 (AU) ................................ 2008903046

(51) Int. Cl.
*H04N 7/18* (2006.01)
*G06T 17/05* (2011.01)
*G06T 7/00* (2006.01)
(Continued)

(52) U.S. Cl.
CPC .............. *G06T 17/05* (2013.01); *G06T 7/0044* (2013.01); *G06T 7/0051* (2013.01); *G06T 2200/04* (2013.01); *G01C 1/04* (2013.01); *G01C 15/00* (2013.01)

(58) Field of Classification Search
CPC ....... G01B 11/022; G01B 11/024; H04N 7/18
USPC ........................ 348/42–60, 135–142
See application file for complete search history.

(56) References Cited

U.S. PATENT DOCUMENTS 4,954,837 A    9/1990  Baird
5,101,268 A *  3/1992  Ohba ............................. 348/43
(Continued)

FOREIGN PATENT DOCUMENTS

JP         08285590     11/1996
JP    2008285590 A     11/1996
(Continued)

*Primary Examiner* — Andy Rao
(74) *Attorney, Agent, or Firm* — The Ollila Law Group LLC (57) ABSTRACT

The present invention provides a method for approximating the location of a point of interest relative to a three dimensional coordinate system, the method including the steps of: orientating a camera toward the point of interest such that the point of interest can be seen within a camera view; retrieving camera data including a location relative to the three dimensional coordinate system, and a camera position including a camera heading and a camera tilt; querying an associated topographic map database to identify one or more coordinates located on the topographic map along the camera heading to form a first dataset; computing one or more coordinates located on a radial plane between the camera and the point of interest based on the camera heading and camera tilt to form a second dataset; and comparing the first dataset with the second dataset to identify a pair of matching coordinates; wherein the matching coordinates represent the three dimensional coordinate location of the point of interest. A system and software for performing the method is also provided.

17 Claims, 10 Drawing Sheets

(51) Int. Cl.
   *G01C 1/04* (2006.01)
   *G01C 15/00* (2006.01)

(56) References Cited

U.S. PATENT DOCUMENTS

| | | | |
|---|---|---|---|
| 6,744,397 B1 | 6/2004 | Hager et al. | |
| 2002/0060784 A1* | 5/2002 | Pack et al. | 356/6 |
| 2005/0273254 A1 | 12/2005 | Malchi et al. | |
| 2008/0074639 A1 | 3/2008 | Donoghue et al. | |
| 2013/0155243 A1* | 6/2013 | Dow et al. | 348/152 |

FOREIGN PATENT DOCUMENTS

| | | |
|---|---|---|
| JP | 2001189888 | 7/2001 |
| JP | 2001359083 A | 12/2001 |
| JP | 2004144605 A | 5/2004 |
| JP | 2004145638 A | 5/2004 |
| JP | 2004145642 | 5/2004 |
| JP | 2004145642 A | 5/2004 |
| JP | 2005207862 | 8/2005 |
| JP | 2005323253 | 11/2005 |
| JP | 2011102495 A | 5/2011 |
| WO | 9735433 A1 | 9/1997 |

* cited by examiner

SPATIAL PREDICTIVE APPROXIMATION AND RADIAL CONVOLUTION

FIELD OF THE INVENTION

This invention relates generally to approximation of the location of a point of interest relative to a three dimensional coordinate system and more particularly, to approximating the location of a point of interest selected by a user within a camera view. The invention has a particular relevance to digital mapping and geographic information system technologies and it will be convenient to hereinafter describe the invention in this context.

BACKGROUND TO THE INVENTION

Establishing the map coordinates of a point of interest observed by an observer in the field traditionally involves a relatively crude approach. One such approach is triangulation which involves establishing two, or ideally three overlapping views from known positions at various angles to establish distance vectors that can be used to approximate the map coordinates at a point of interest, based on the point of intersect of the distance vectors. The result can be manually translated to map or grid coordinates or preferably, latitude and longitude values which can be represented on a geo-coded electronic topographic map. An alternative approach may involve use of an Osborne Device to find a directional bearing and pitch/tilt to the point of interest e.g. smoke indicating the approximate location of a fire.

These conventional approaches are time consuming, resource intensive and provide only rudimentary accuracy. Some authorities suggest that typical expectations for accuracy using triangulation techniques are in the order of approx +/−300 meters and require up to 20 minutes or longer to establish coordinates in ideal conditions, i.e. excellent visibility and using at least three overlapping views for the triangulation approach.

Accordingly it would be desirable to provide an improved method for approximating the position of a point of interest relative to a three dimensional coordinate system which ameliorates at least one of the problems associated with prior art approaches.

Other objects and advantages of the invention will become apparent to those of ordinary skill in the art having reference to the following specification together with its drawings.

SUMMARY OF THE INVENTION

According to an aspect of the present invention there is provided a method for approximating the location of a point of interest relative to a three dimensional coordinate system, the method including the following steps:
(a) orientating a camera toward the point of interest such that the point of interest can be seen within a camera view;
(b) retrieving camera data including a camera location relative to the three dimensional coordinate system, and a camera position including a camera heading and a camera tilt;
(c) querying an associated topographic map database to identify one or more coordinates located on the topographic map along the camera heading to form a first dataset;
(d) computing one or more coordinates located on a radial plane between the camera and the point of interest based on the camera heading and the camera tilt to form a second dataset;
(e) comparing the first dataset with the second dataset to identify a pair of matching coordinates;
wherein the matching coordinates represent the three dimensional coordinate location of the point of interest.

The camera view is displayed on a graphic user interface provided on a client user terminal located remotely from the camera. The camera may be a still camera or more preferably a video camera. The location of the camera may be fixed and therefore known, or could be dynamic as in the case of the camera being mounted on a moving vehicle or aircraft, in which case the location of the camera is determined via GPS or other suitable means and transmitted via the server to the client user terminal in real-time.

According to an embodiment, the step of retrieving camera data includes the step of computing the camera heading corresponding to the point of interest based on the camera tilt and a pan value.

The method may further include the step of determining a difference in height or altitude and a horizontal distance between the camera location and the point of interest to enable verification of the three dimensional coordinate location of the point of interest.

According to another embodiment, the one or more coordinates located on the radial plane between the camera and the point of interest are computed at predetermined intervals along the radial plane. Preferably, the predetermined interval corresponds to an available topographic interval.

According to yet another embodiment, the step of selecting the point of interest includes orientating the camera to select three or more points to define a polygon representing an area of interest, for each point defining the polygon the method further including repeating steps (b) to (e) to approximate the position of the each point which defines the area of interest.

Alternatively, the step of selecting the point of interest includes selecting three or more points to define a polygon representing an area of interest on the electronic topographic map and querying the topographic map database to retrieve topographic map coordinates corresponding to each point defining the polygon.

The method may further include the step of determining a difference in height or altitude and a horizontal distance between the camera location and each point defining the polygon to enable verification of the three dimensional coordinate location of each point defining the polygon representing an area of interest.

In one form of the invention, the method further includes the step of presenting to the user a topographic map identifying the three dimensional coordinates corresponding to the point of interest or the three or more points defining a polygon representing an area of interest.

According to another aspect of the present invention there is provided a method for directing a user selected camera to a point of interest located in a three dimensional coordinate system, the point of interest being selected by a user on a topographic map graphical user interface, the method including the following steps:
(a) retrieving the three dimensional coordinate location of the point of interest from a topographic map data base;
(b) retrieving camera data including a location relative to the three dimensional coordinate system, and an initial camera position including a camera heading and a camera tilt;
(c) using the camera location relative to the three dimensional coordinate system, determining a required camera position including a required camera heading and a required camera tilt wherein the point of interest will be within a camera view;
(d) transmitting the required camera heading and required camera tilt to the camera to cause the camera to move from the initial camera position to the required camera position.

According to yet another aspect of the present invention, there is provided a method of identifying a camera providing an optimal view of a point of interest located in a three dimensional coordinate system, the point of interest being selected by a user on an electronic topographic map, the method including the following steps:

(a) retrieving an actual location of the point of interest relative to the three dimensional coordinate system from a topographic map database;
(b) identifying one or more cameras located proximal to the point of interest;
(c) for each proximal camera retrieving a camera location relative to the three dimensional coordinate system;
(d) querying the topographic map database to retrieve coordinates including a topographic elevation value located on the topographic map along a camera heading between the camera and the point of interest;
(e) for each proximal camera computing a series of theoretical coordinates including a theoretical elevation value located along a radial plane between the camera and the point of interest;
(f) comparing the topographic elevation values with the theoretical elevation values;
wherein a clear view of the point of interest is available from the camera only when a theoretical elevation value is greater than or equal to the topographic elevation values; and
(g) repeating steps (d) to (f) for each proximal camera to identify those proximal cameras from which a clear view of the point of interest is available.

In one embodiment, the method further includes the steps of computing a camera position including a camera heading and a camera tilt for camera providing an optimal view of a point of interest and transmitting the required camera position to the camera to cause the camera to move from an initial camera position to a required camera position wherein the point of interest is within a camera view of the camera.

If a clear view to the point of interest is available from more than one proximal camera, the camera located closest to the point of interest may be selected for viewing the location of the point of interest.

If a clear view to the point of interest is not available from a proximal camera, the camera providing a clear view to an alternative point closest to the point of interest may be selected.

In one form of the invention, the camera has a fixed location in relation to the coordinate system.

According to still another aspect of the present invention, there is provided a system for approximating the location of a point of interest relative to a three dimensional coordinate system, the system including:

(a) a camera to be orientated towards the point of interest such that a user can view the point of interest in a camera view;
(b) a first database for storing camera data including a camera location relative to the three dimensional coordinate system, and a camera position including a camera heading and a camera tilt;
(c) a second database for storing electronic topographic map data;
(d) a processor for identifying one or more coordinates located on the electronic topographic map along the camera heading to form a first dataset and computing one or more coordinates located on a radial plane between the camera and the point of interest based on the camera heading and camera tilt to form a second dataset;

wherein a comparison of the first dataset with the second dataset identifies a pair of matching coordinates which represent the three dimensional coordinate location of the point of interest.

Preferably, the system includes a graphic user interface which displays the location of the three dimensional coordinates corresponding to the point of interest on an electronic topographic map. More preferably, the graphic user interface further displays the camera view from a user selected camera.

BRIEF DESCRIPTION OF THE DRAWINGS

It will be convenient to hereinafter describe the invention in greater detail by reference to the accompanying figures which facilitate understanding of the present invention. The particularity of the figures and the related description is not to be understood as superseding the generality of the broad identification of the invention as given in the attached claims.

DETAILED DESCRIPTION

Figure 1:
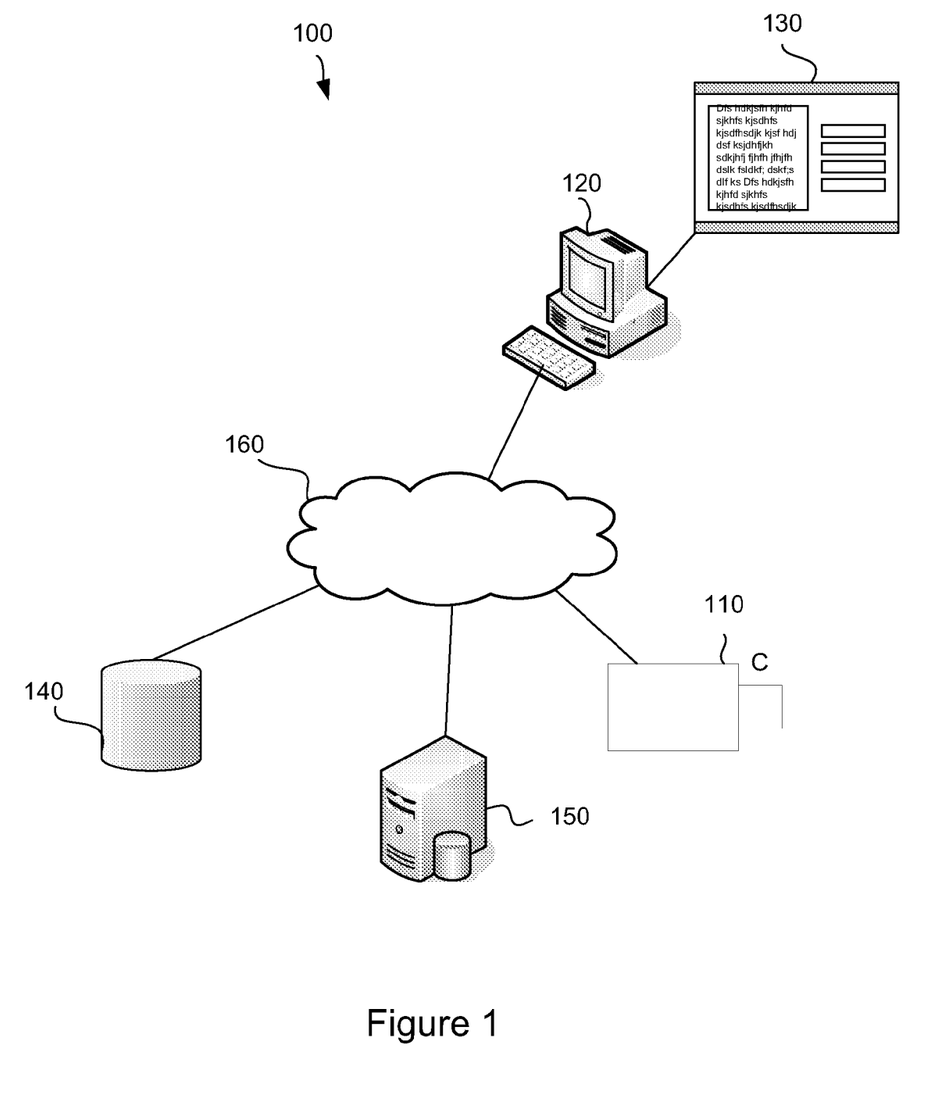
FIG. 1 is an example system for implementing the method of the present invention according to an embodiment.

Referring firstly to FIG. 1, there is shown an example system 100 for implementing the method of the present invention. The system uses a single camera perspective, together with spatial data to determine the location of a point of interest viewed through the camera view, on a map, e.g. the location of a fire or object. The system 100 includes one or more cameras located in the field 110, a client user terminal 120 providing a graphic user interface 130, and a database 140 in communication with a server 150 and the client user terminal 120. The one or more cameras 110, client user terminal 120 and server 150 are interconnected by means of a suitable communications network 160 such as the Internet or a private network.

The graphic user interface 130 displays to the user a electronic topographic map on which the location of a point of interest is indicated spatially, i.e. on an electronic topographic map, as well as in a camera view captured by a camera located in the field, showing the real world location of the point of interest.

The spatial data which generally comprises topographic map data may be commercially available topographic map data in the form latitude, longitude and altitude or elevation (stored as Gx,y,z) and maintained remotely from the client user terminal 110, in a database 140 by the relevant authority, e.g. Land Victoria. Querying of the spatial data stored in the database 140 is initiated by a user via the client terminal 110. The user employs camera view functions and controls provided on the graphic user interface 130 to orientate the camera view towards the point of interest (also hereinafter referred to as the "POI"). Whilst the spatial data may be maintained remotely in database 140 it will be appreciated that the data may also be made locally or remotely accessible to the user terminal 110 in any other convenient form, such as a CD-ROM or other portable or non-portable data storage device.

The system of the present invention uses camera controls e.g. Pan, Tilt and Zoom (also hereinafter referred to as "PTZ" controls) provided on the camera view graphic user interface to control input to the system, together with an electronic topographic map. The system extracts heading and tilt data from the camera based on the location and position of the camera, and processes this data together with elevation data (known from the three dimensional coordinates representing the camera's location) on the same heading or bearing as the camera in order to establish the point where the camera's trajectory (shown as the radial plane 230 in FIG. 2) and the topography or terrain intersect. This point of intersect is preferably translated into Lat/Long/Alt format for display on the electronic topographic map.

Other cameras within the network may be used to collaborate and/or validate the data obtained from a singe camera view to provide error checks and/or increase accuracy. This is particularly beneficial in poor visibility conditions and/or when the point of interest is obstructed. In such cases, a virtual triangulation can be orchestrated between overlapping views of proximal cameras, to identify alternate and optimal camera views to a point of interest.

In order to establish the position of a point of interest using a single camera view, the three dimensional coordinate ("tuple") camera location must be known. Accordingly, the location of all fixed or mobile cameras will be known and stored in a camera database (in the form Cx,y,z). In the case of a moving camera having a dynamic location, i.e. in the case of cameras mounted on a moving vehicle or aircraft, the coordinates corresponding to the location of the camera are determined using a positioning system such as GPS or similar means and transmitted to the server in real-time. Field cameras may be calibrated to a true north bearing (azimuth), and placed level on a horizontal radial plane. To achieve this, field cameras are calibrated using known survey points or landmarks having predetermined or known location coordinates in the format Calx,y,z.

In summary, the system of the present invention can operate in four different modes:

1. Target Mode

Action—The user employs the camera (PTZ) controls to orientate the camera until the point of interest is approximately in the centre of the camera view which is displayed on the graphic user interface as a still or video image. The user then initiates the "target" process via the graphical user interface.

Result—An electronic marker and coordinates corresponding to the point of interest location (POIx,y,z) are produced on the electronic topographic map.

2. Geo-Fence Mode

Action—The user selects a minimum of three points to form a polygon defining an area of interest. This may involve the user employing the camera (PTZ) controls to orientate the camera to each point of the polygon defining the area of interest, and/or the user could use a series of mouse clicks directly on the map to form a polygon defining an area of interest on the electronic topographic map. Defining an area of interest is useful where the actual target point of interest is obscured from direct line of sight.

Result—A highlighted or shaded region (polygon) is produced on the electronic topographic map together with coordinates corresponding to each point defining the polygon.

3. Reverse Lookup Mode

Action—The user selects one or more cameras and a point of interest on the electronic topographic map by clicking directly on the map.

Result—An electronic marker is placed on the electronic topographic map, and a required camera position is automatically transmitted to the selected cameras to cause the one or more cameras to orientate such that the point of interest appears in the camera view. The camera view from each of the cameras is then displayed to the user on the graphic user interface.

4. Virtual Triangulation Mode

Action—The user selects at least one camera and a point of interest and the system determines which one or more cameras provide an optimal line of sight to the point of interest. The camera with the optimal line of sight may then be directed towards the point or region of interest.

Result—Provides the user with an optimal view of the point of interest. The optimal camera view is identified and displayed to the user on the graphic user interface, along with an on screen marker. In addition, the point where overlapping camera views or trajectories intersect on the electronic topographic map can be calculated and displayed in the form VTx,y,z.

The above modes are described in more detail with reference to FIGS. 2 to 8 below.

Figure 2:
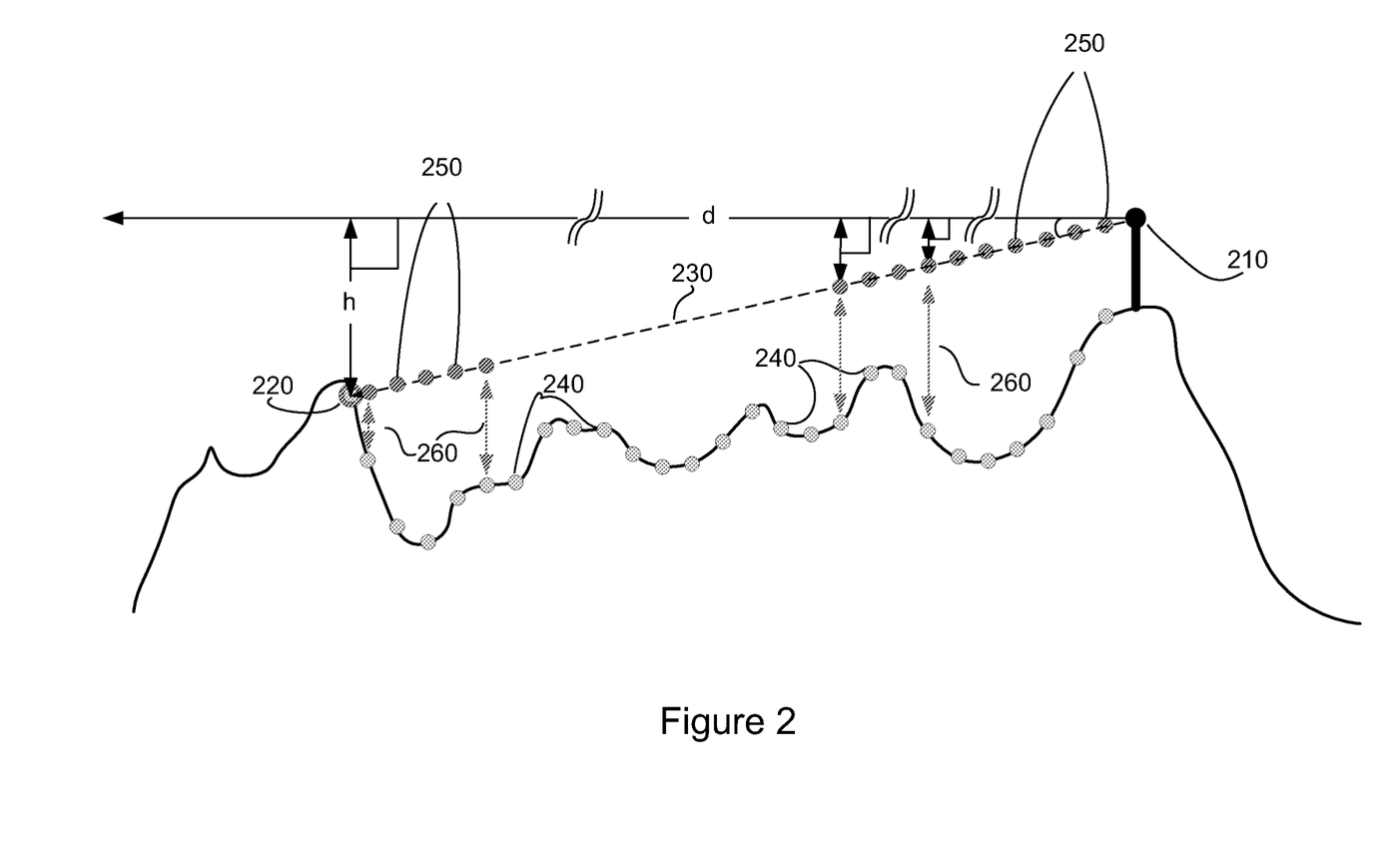
FIG. 2 is a diagram showing the key elements required to implement the method of the present invention.

Referring firstly to FIG. 2, the camera 210 is positioned towards the point of interest (POI) 220 such that the point of interest can be sighted in the camera view. Then the system retrieves the known camera location coordinates (Cx,y,z) and queries the camera for camera position data (Cp,t,z). The camera position data (Cp,t,z) is used to provide the heading or bearing and tilt of the camera 210 to enable the system to determine a radial plane 230 or camera trajectory (also the "hypotenuse") located between the camera 210 and the point of interest 220.

Known topographic coordinates located between the camera 210 and the point of interest 220 and on the same heading as the camera but on the terrain or topography, are retrieved from the topographic map database. These coordinates form a first dataset comprising known coordinates (Gx,y,z) 240.

A second dataset of interim coordinates (IPOIx,y,z) 250 are computed on the same heading as the camera and along the radial plane 230 between the camera 210 and the point of interest 220. The interim coordinates (IPOIx,y,z) are computed at predetermined and preferably regular intervals along the radial plane 230. For instance, the intervals may correspond to the underlying topographic intervals available from the topographic map database (i.e. the distance between known coordinates (Gx,y,z) 240.

Figure 3:
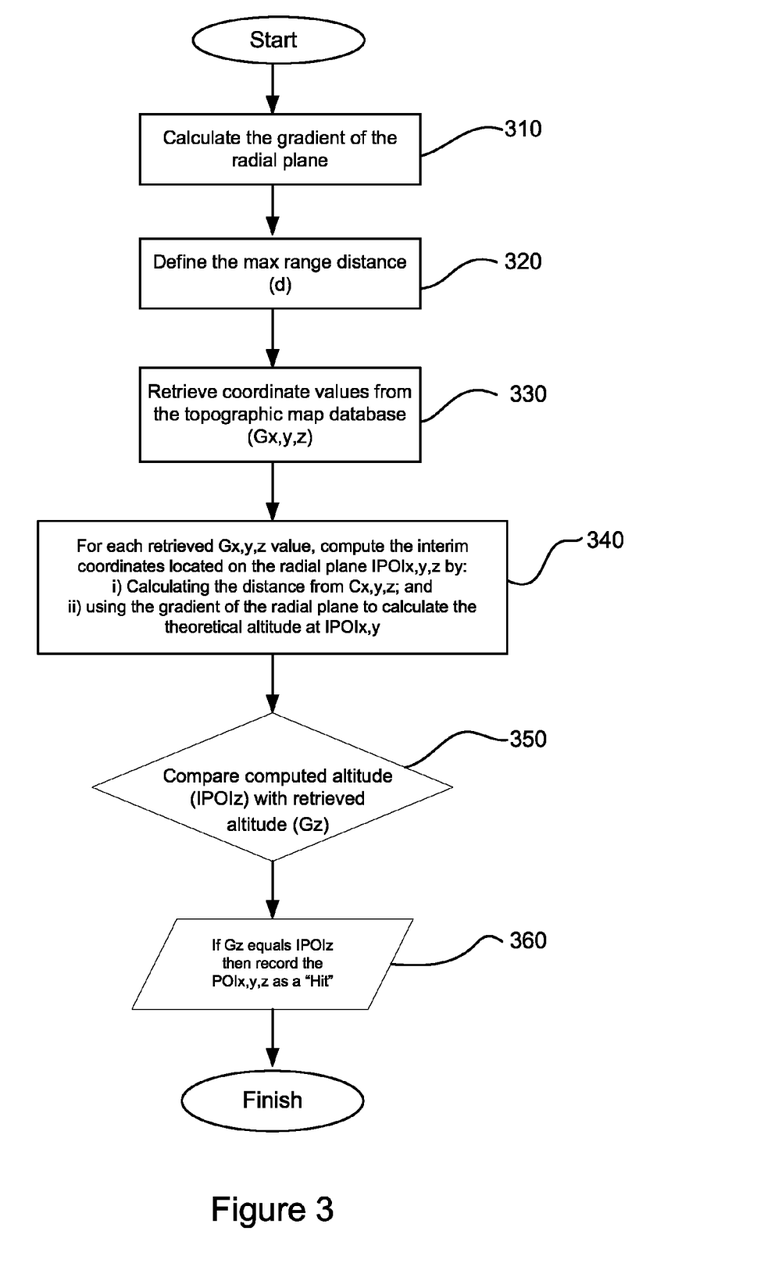
FIG. 3 is a flowchart showing the operation of a core process of the present invention.

Referring now to FIG. 3, a core process or sub routine is used to compute and compare the first and second datasets (i.e. retrieved known coordinates (Gx,y,z) and computed interim coordinates (IPOIx,y,z) and in particular the elevation data (IPOIz and Gz). The sub routine involves calculating the gradient of the radial plane 230 based on the camera position data (Cp,t,z) at step 310 and defining the maximum distance (d) (see FIG. 2) to be processed at step 320. The known coordinate positions (Gx,y,z) located on the same camera heading as the camera are retrieved from the topographic map database at step 330.

For each set of known coordinates (Gx,y,z) the distance (d) from the point of origin (i.e. the camera location Cx,y,z) is computed and the gradient of the radial plane is used to compute a theoretical elevation for the interim coordinates (IPOIz) at the same Gx,y location at step 340. Given that the x,y position of every point along the same camera heading as the radial plane is readily deduced (i.e. Gx,y and IPOIx,y match) it is the z coordinate or elevation value that is of particular interest for the purposes of the present invention. As a result the comparison is essentially reduced to a comparison of the known elevation value (Gz) with the computed theoretical elevation value (IPOIz) for each x,y position at step 350. When a match occurs (i.e. Gz=IPOIz), the x,y,z coordinates of the actual point of interest (POI) have been identified. This is the point at which the radial plane (or camera trajectory) intersects the terrain or topography. The x,y,z coordinates are then recorded and stored by the system as the actual POIx,y,z coordinates at step 360.

"Hit" and "near miss" thresholds may be predefined so that a match will be recorded so that the difference between Gz and IPOIz need not be exactly zero to constitute a match. A match within a "hit" threshold is recorded as a match. A non match is recorded as a "near miss".

Figure 4:
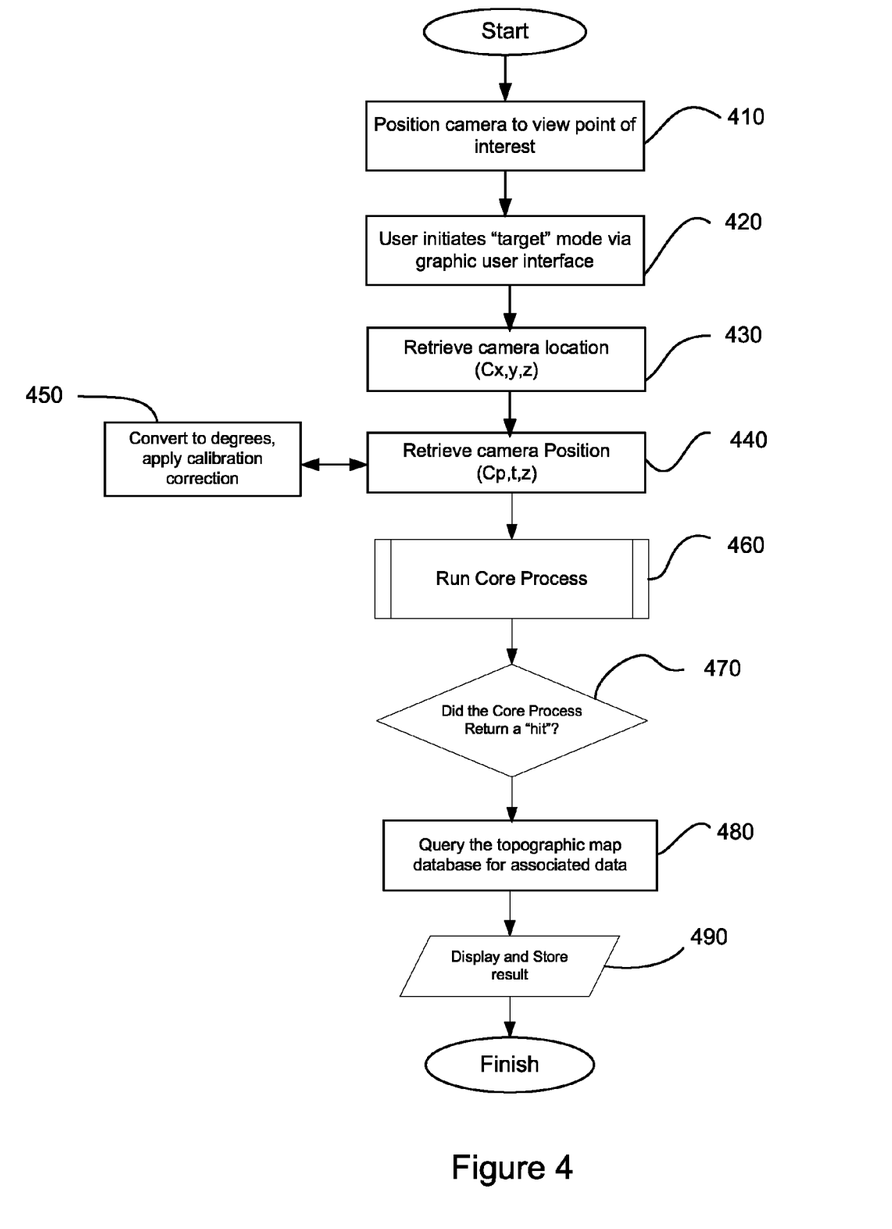
FIG. 4 is a flowchart showing the operation of the method of the present invention in target mode according to an embodiment.

Referring now to FIG. 4, there is shown a flowchart depicting the method of approximating the position of a point of interest in the "target" mode. The point of interest is selected at step 410 by positioning the camera so that the point of interest can be sighted within the camera view.

Once the point of interest is located within the camera view the user initiates the approximation process in the "target" mode via the graphical user interface at step 420. The system then retrieves the known camera location coordinates (Cx,y,z) at step 430 and queries the camera for camera position data (Cp,t,z) at step 440. The camera position data (Cp,t,z) is converted to degrees and has a calibration correction applied at step 450 to provide the heading or bearing and tilt of the camera.

The system then runs the core process described with reference to FIG. 3 at step 460 to compute and compare the first and second datasets. If the core process returns a "hit", i.e. a match where difference between Gz and IPOIz is zero or within a predetermined threshold defining a "hit" at step 470, the topographic database is queried for any associated data such as a street address or other spatial data at step 480, and the x,y,z coordinates are recorded and stored by the system as the actual POI coordinates (POIx,y,z) at step 480.

Figure 5:
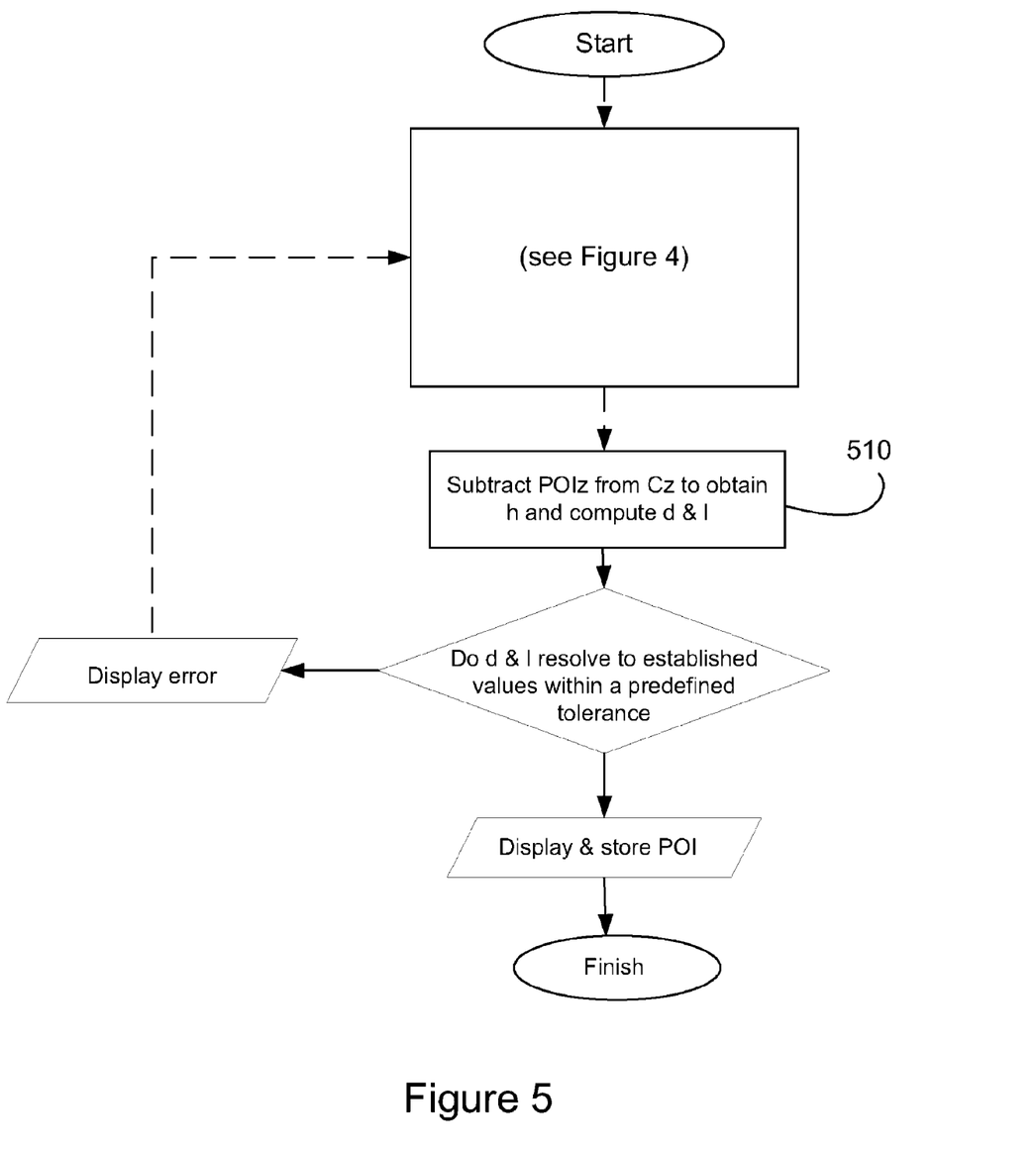
FIG. 5 is a flowchart showing a method for verifying the approximation of the point of interest coordinates according to the method shown in FIG. 4.

Referring now to FIG. 5, the approximation of the actual point of interest coordinates POIx,y,z can be verified using the difference in altitude or elevation between the camera location Cz and the point of interest POIz to compute the length (l) of the radial plane (i.e. the "hypotenuse") and the adjacent horizontal distance (d) between the camera and the point of interest at step 510 (see also FIG. 2). These variables are used to validate the camera tilt, and to determine that any deviations are within acceptable tolerances. Other trigonometric checks may be used to further verify the data.

Figure 6:
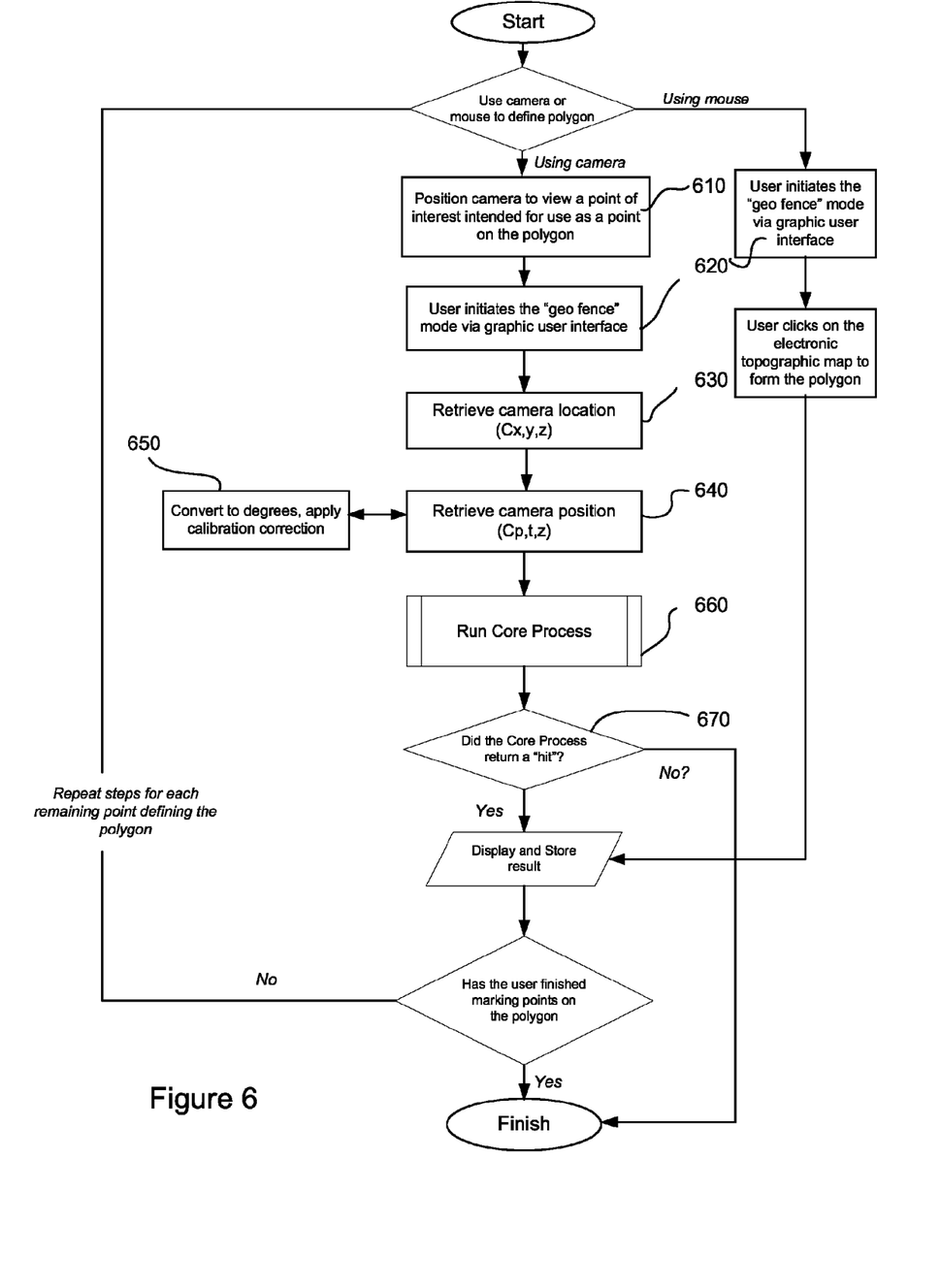
FIG. 6 is a flowchart showing the operation of the method of the present invention in geo-fence mode according to an embodiment.

Referring now to FIG. 6, if the user selects an area of interest (which may surround a point of interest or other objects), an approximation of the location of the area of interest can be obtained by operating the system in the "geo-fence" mode. An area of interest is selected by the user selecting a minimum of three points to define a polygon that may enclose a point of interest or simply define a general region of interest. The plurality of points defining the polygon may be selected by a user using the camera view function as described in reference to FIG. 4 and/or via mouse clicks on the electronic topographic map at step 610. The user initiates the process in the "geo fence" mode via the graphical user interface at step 620.

If the user selects one or more of the plurality of points defining a polygon through a series of mouse clicks on the electronic topographic map, each mouse click causes the topographic map database to be queried for the known coordinates (Gx,y,z) corresponding to each point defining the area of interest.

For any one or more points of the polygon defining the area of interest that are defined by orientating the camera to mark the point forming part of the polygon, the system retrieves the camera location data (Cx,y,z) at step 630 and queries the camera for corresponding camera position or offset data (Cp,t,z) at step 640. The camera position data (Cp,t,z) is converted to degrees and has a calibration correction applied at step 650 to provide the heading and tilt of the camera.

The system then runs the core process described with reference to FIG. 3 at step 660 to compute and compare the first and second datasets corresponding to a first point defining the polygon. The first and second datasets (i.e. retrieved known coordinates Gx,y,z and computed interim coordinates IPOIx,y,z) are compared at step 670. When a match occurs, the x,y,z coordinates of the first point defining the polygon are defined (i.e. POIx,y,z) and a marker is placed on the electronic topographic map. These steps are repeated for each remaining point defining the polygon. The completed polygon is then displayed to the user on the electronic topographic map provided on the graphic user interface as a shaded or otherwise highlighted area.

Figure 7:
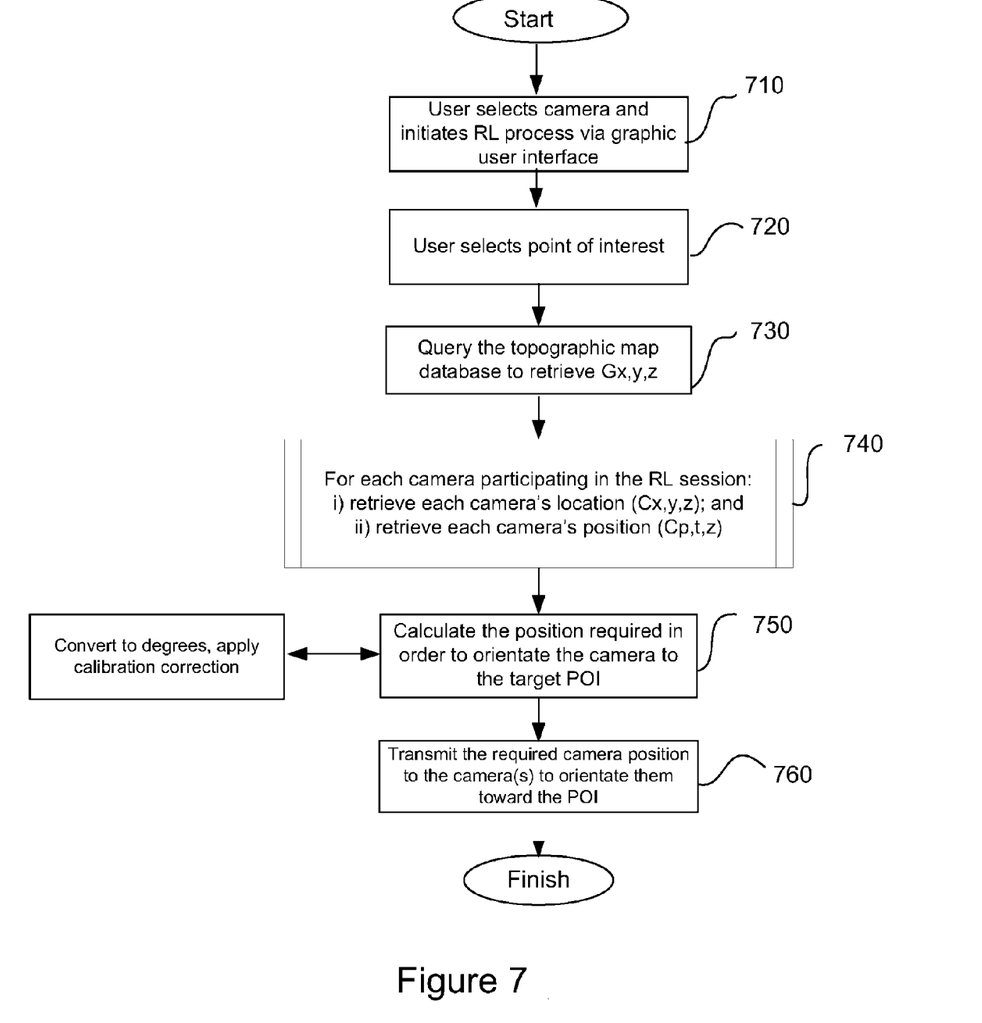
FIG. 7 is a flowchart showing the operation of the method of the present invention in reverse lookup mode according to an embodiment.

Referring now to FIG. 7, the "reverse lookup" mode enables a user to cause one or more cameras selected to participate in the "reverse lookup" session at step 710 to point towards a point of interest which has been selected by the user at step 720. The point of interest is selected using a mouse to select a point. Alternatively a point may be selected by entering a physical address (e.g. a street address). The system then retrieves the known coordinates corresponding to the location of the point of interest from the topographic map database (i.e. Gx,y,z=POIx,y,z) at step 730.

For each camera participating in the "reverse lookup" session the system retrieves the camera location data (Cx,y,z) for the selected camera and current camera position data (Cp,t,z) at step 740. Using the known point of interest coordinates (POIx,y,z) and the camera location (Cx,y,z), the system computes a required camera position, i.e. camera heading and camera tilt, required to orientate the camera towards the point of interest at step 750. The required camera position is transmitted to the camera to cause the camera to move from its current position, toward the point of interest at step 760.

Figure 8:
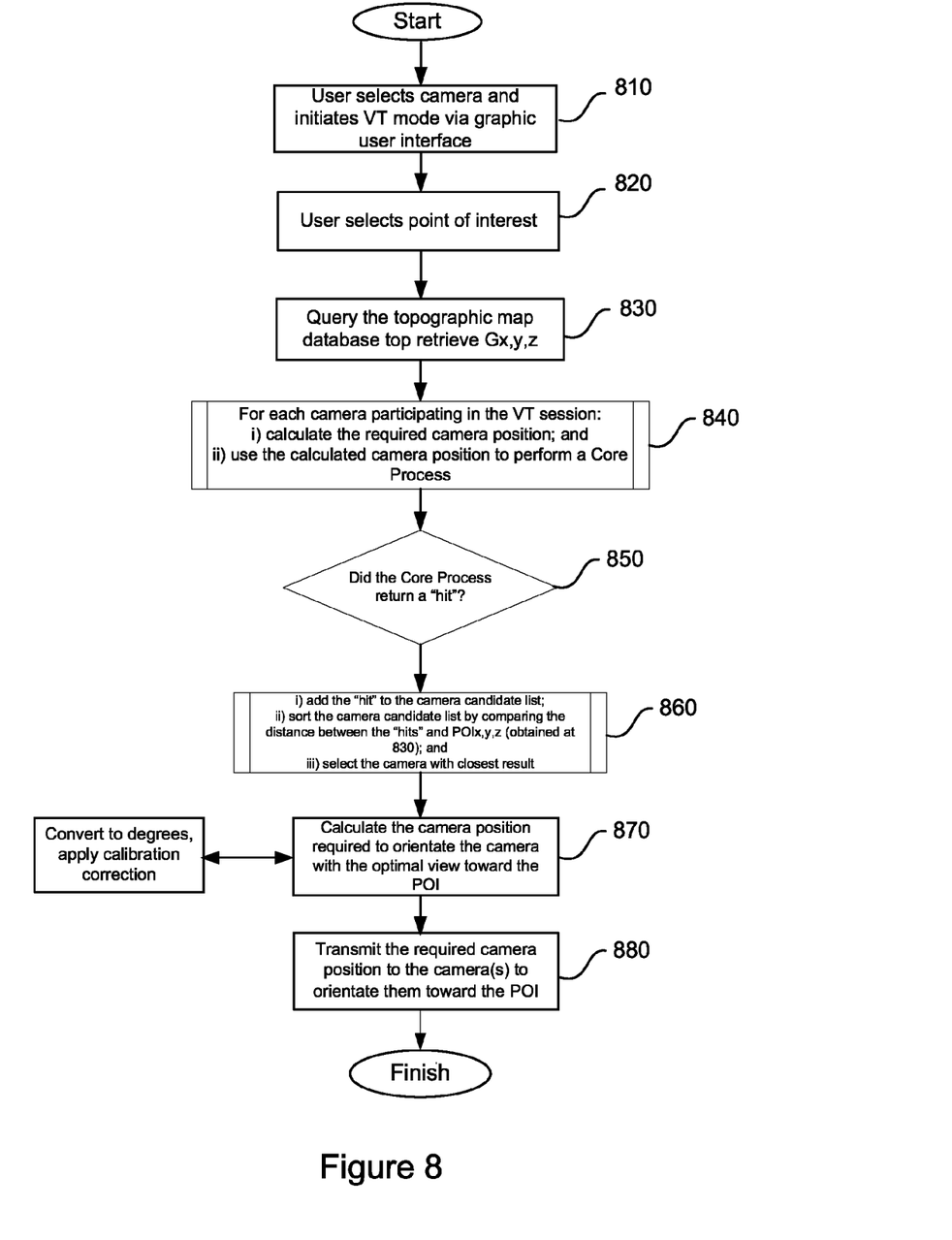
FIG. 8 is a flowchart showing the operation of the method of the present invention in virtual triangulation mode according to an embodiment.

Referring now to FIG. 8, the "virtual triangulation" mode is used to provide the user with the optimal camera view based on the best line of sight of the point of interest. The user selects a primary camera and initiates the "virtual triangulation" mode at step 810. The point of interest is selected by the user at step 820.

The system queries the topographic map database to retrieve known coordinates corresponding to the point of interest (i.e. Gx,y,z=POIx,y,z) from the topographic map database at step 830. The system then queries the camera database to determine which cameras are closest to the point of interest or, alternatively, the user may have manually selected one or more cameras proximal to the primary camera to participate in the virtual triangulation session. Proximal cameras which may be user selected or system selected, are tagged as virtual triangulation participants in a camera candidate list.

For each participating camera, the system uses the known camera position (Cx,y,z) and retrieved known point of interest coordinates (POIx,y,z) (i.e. obtained at step 830) to compute a required camera position and to process a theoretical core process as described with reference to FIG. 3 to compute and compare the first and second datasets at step 840. At step 860, the system sorts the camera candidate list based on the distance between the "hits" produced by the core process and the POIx,y,z (obtained in the form Gx,y,z at step 830) so that the head of the camera candidate list is the camera which provides the closest result. At step 870 the system calculates the camera position required to orientate the camera at the head of the camera candidate list toward the point of interest. The required camera position is transmitted to the camera at step 880 to orientate the camera from its current position towards the point of interest.

A camera is considered to have a "clear line of sight" to the point of interest when a match occurs between the "hit" result and the POIx,y,z (obtained in the form Gx,y,z at step 830). In the case where a clear view to the point of interest is available from more than one proximal camera, the camera located closest to the point of interest may be selected for viewing the location of the point of interest.

Optionally, trace lines between each camera and the point of interest (which are representative of the camera heading or bearing) may be provided on the electronic topographic map while the system operates in the virtual triangulation mode. These trace lines provide a visual guide to the user to enable a further check to be performed on the point of interest coordinates determined by the system, in that the point of interest should be located at the point of intersect of the trace lines. The system also provides a traditional triangulation feature that calculates and displays the POIx,y,z based on the intersection of the trace lines or trajectories from two or more cameras.

Figure 9:
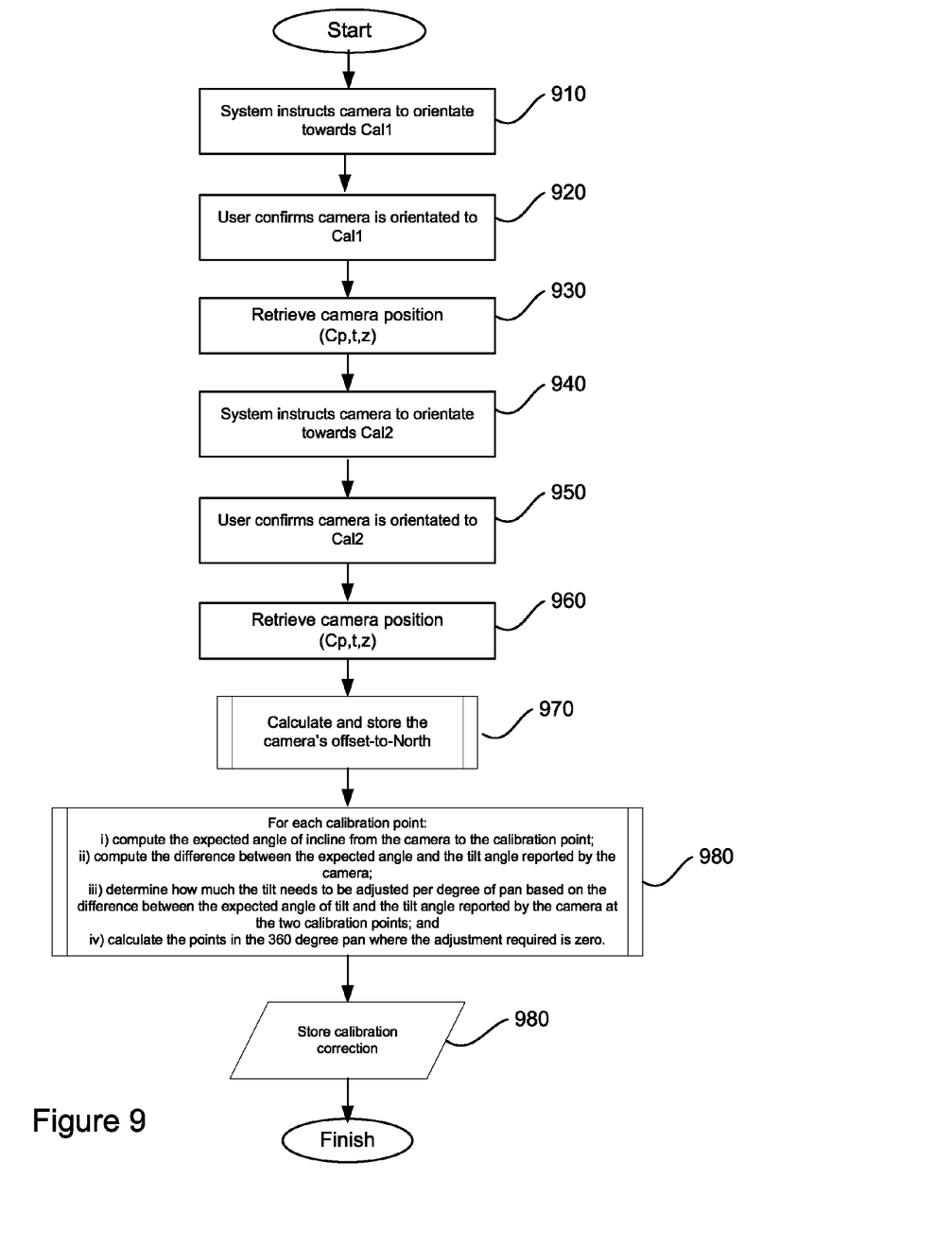
FIG. 9 is a flowchart showing a method of calibrating the system of the present invention according to an embodiment.

Referring now to FIG. 9, the system incorporates an interactive calibration function intended to establish a camera offset-to-north, and to compensate for imperfections in the installation of each camera in the field or any other imperfection which may affect the horizontal alignment of the camera. The objective is to have all cameras in the field or region calibrated to a true north, and placed level on a horizontal radial plane.

Lat/Long/Alt data corresponding to the location of known landmarks or calibration points are entered into the system's database in the format Cal1x,y,z, Cal2x,y,z, etc. Each camera requires a minimum of two calibration points associated with it, and the corresponding camera positions when the camera is orientated to view these landmarks are stored in the database.

The calibration process involves the system firstly orientating the camera to view calibration point Cal1 at step 910. The user is then prompted to make minor adjustments (using PTZ controls) as required to ensure that the camera view fully captures and is centred on the landmark that constitutes calibration point Cal1 at step 920. Once the user has confirmed that the camera is pointing directly to Cal1, the camera is interrogated for camera position data (Cp,t,z) at step 930.

The camera is then orientated to view calibration point Cal2 at step 940. The user is prompted to make minor adjustments (using PTZ controls) as required to ensure that the camera view fully captures and is centred on the landmark that constitutes calibration point Cal2 at step 950. Once the user has confirmed that the camera is pointing directly to Cal2, the camera is interrogated for camera position data (Cp,t,z) at step 960.

The camera's offset-to-north is then computed at step 970. The calibration process uses the camera location (Cx,y,z) and the location of at least one known calibration point (e.g. Cal1x,y,z and/or Cal2x,y,z) to establish a grid bearing between the camera and the calibration point(s). The system computes the difference between (a) the forward azimuth between the location of the camera and the calibration point, and (b) the camera's pan value when the camera is orientated toward the calibration point. This establishes the offset-to-north for the camera. Preferably, more than one calibration point is used and the results are averaged to establish the offset-to-north.

At step 980, the required degree of tilt compensation required to be applied is computed by comparing the expected angle of incline from the camera to the calibration point and the actual pitch/tilt angle reported by the camera when the camera is positioned to view a calibration point. The system then determines how much the tilt needs to be adjusted per degree of pan based on the difference between the expected angle of incline and the tilt angle reported by the camera at two calibration points. The two points in the radial plane where the tilt compensation required to be applied is equal to zero is computed and are referred to as zero crossing points.

The computed results are stored by the system as the new calibration data at step 990.

The system 100 may be implemented using hardware, software or a combination thereof and may be implemented in one or more computer systems or processing systems. In particular, the functionality of the client user terminal 120 and its graphic user interface 130, as well as the server 150, may be provided by one or more computer systems capable of carrying out the above described functionality.

Figure 10:
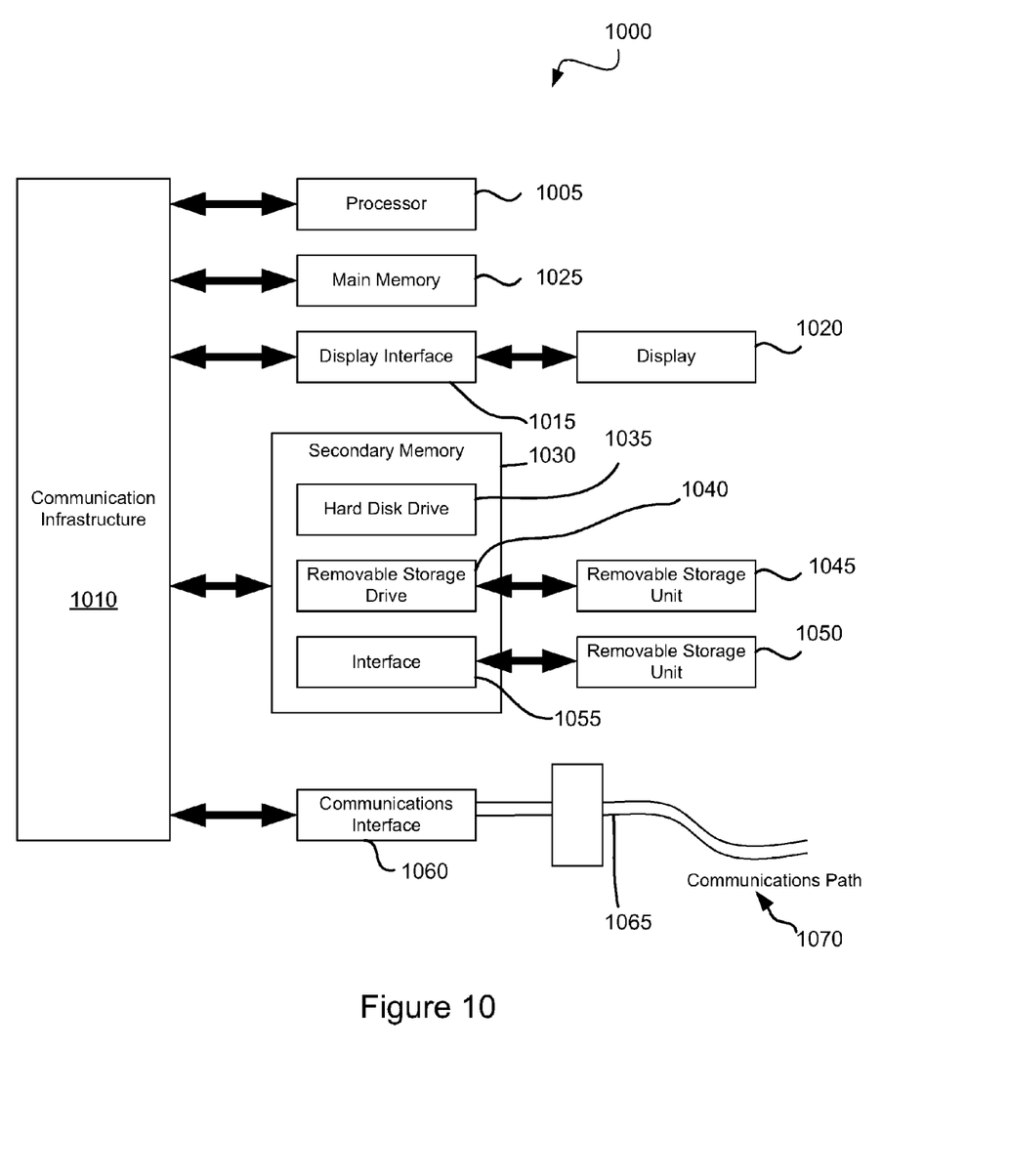
FIG. 10 is a schematic diagram showing various functional elements of the computer-enabled system of FIG. 1 in block form.

Such a computer system is illustrated in FIG. 10. In this Figure, an exemplary computer system 1000 includes one or more processors, such as processor 1005. The processor 1005 is connected to a communication infrastructure 1010. The computer system 1000 may include a display interface 1015 that forwards graphics, texts and other data from the communication infrastructure 1010 for supply to the display unit 1020. The computer system 1000 may also include a main memory 1025, preferably random access memory, and may also include a secondary memory 1030.

The secondary memory 1030 may include, for example, a hard disk drive 1035, magnetic tape drive, optical disk drive, etc. The removable storage drive 1040 reads from and/or writes to a removable storage unit 1045 in a well known manner. The removable storage unit 1045 represents a floppy disk, magnetic tape, optical disk, etc.

As will be appreciated, the removable storage unit 1045 includes a computer usable storage medium having stored therein computer software in a form of a series of instructions to cause the processor 1005 to carry out desired functionality. In alternative embodiments, the secondary memory 1030 may include other similar means for allowing computer programs or instructions to be loaded into the computer system 1000. Such means may include, for example, a removable storage unit 1050 and interface 1055.

The computer system 1000 may also include a communications interface 1060. Communications interface 1060 allows software and data to be transferred between the computer system 1000 and external devices. Examples of communication interface 1060 may include a modem, a network interface, a communications port, a PCMCIA slot and card etc. Software and data transferred via a communications interface 1060 are in the form of signals 1065 which may be electromagnetic, electronic, optical or other signals capable of being received by the communications interface 1060. The signals are provided to communications interface 1060 via a communications path 1070 such as a wire or cable, fibre optics, phone line, cellular phone link, radio frequency or other communications channels.

Although in the above described embodiments the invention is implemented primarily using computer software, in other embodiments the invention may be implemented primarily in hardware using, for example, hardware components such as an application specific integrated circuit (ASICs). Implementation of a hardware state machine so as to perform the functions described herein will be apparent to persons skilled in the relevant art. In other embodiments, the invention may be implemented using a combination of both hardware and software.

The approximation of the coordination of a point of interest in the field may be supplemented by other features. For example, where the system for approximating the location of a point of interest is used to approximate the location of a fire, the system may further include means for notifying teams (e.g. fire crews or the community) electronically of the fire location through the network, invoking SMS, email, voice or live chat or voice communications, as well as calculating routes for field crews based on the navigational data produced by the system e.g. sending the field crews or community directions to or from a point of interest, based on their current location. Other spatial data, weather, satellite pictures or data, lightning detection can be used as inputs to the system.

The system of the present invention enables a completely unskilled user having no particular knowledge of mapping or triangulation processes, to initiate the process and arrive at an accurate result, in a matter of seconds, using a single camera.

The process increases the level of accuracy and the speed of approximating a location. It significantly reduces the number of, and skill level of the human resources required to conduct this exercise, and reduces the processing time of traditional techniques from minutes (typically 15-20+ minutes or much longer) down to a few seconds.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The invention claimed is:

1. A method for approximating the location of a point of interest relative to a three dimensional coordinate system, the method including the following steps:
   (a) selecting a point of interest by orientating a camera toward the point of interest such that the point of interest can be seen within a camera view;
   (b) retrieving camera data including a camera location relative to the three dimensional coordinate system, and a camera orientation including a camera heading and a camera tilt;
   (c) querying an associated topographic map database to identify one or more sets of three dimensional coordinates located on the topographic map along the camera heading to form a first dataset;
   (d) computing a plurality of sets of three dimensional coordinates located on a camera trajectory between the camera and the point of interest at predetermined and regular intervals along the camera trajectory based on the camera heading and the camera tilt to form a second dataset; and
   (e) comparing the first dataset with the second dataset to identify a pair of matching sets of three dimensional coordinates;
      wherein the matching coordinates represent the three dimensional coordinate location of the point of interest; and
   (f) verifying the three dimensional coordinate location of the point of interest using a difference in elevation between the camera location and the point of interest location to validate the camera tilt;
      wherein if the camera tilt is validated within acceptable tolerances, the position of the three dimensional coordinate location of the point of interest is verified.

2. A method according to claim 1, wherein the step of retrieving camera data includes the step of computing the camera heading corresponding to the point of interest based on the camera tilt and a pan value.

3. A method according to claim 1, further including the step of determining a difference in height or altitude and a horizontal distance between the camera location and the point of interest to enable verification of the three dimensional coordinate location of the point of interest.

4. A method according to claim 1, wherein the predetermined intervals along the camera trajectory correspond to available topographic intervals.

5. A method according to claim 1, wherein the step of selecting the point of interest includes orientating the camera to select three or more points to define a polygon representing an area of interest, for each point defining the polygon the method further including repeating steps (b) to (e) to approximate the position of the each point which defines the area of interest.

6. A method according to claim 1, wherein the step of selecting the point of interest includes selecting three or more points to define a polygon representing an area of interest on the electronic topographic map and querying the topographic map database to retrieve topographic map coordinates corresponding to each point defining the polygon.

7. A method according to claim 5, further including the step of determining a difference in height or altitude and a horizontal distance between the camera location and each point defining the polygon to enable verification of the three dimensional coordinate location of each point defining the polygon within which the point of interest is located.

8. A method according to claim 5, further including the step of presenting to the user a topographic map identifying the three dimensional coordinates corresponding to the point of interest or the three or more points defining a polygon within which the point of interest is located.

9. A method of identifying a camera providing an optimal view of a point of interest located in a three dimensional coordinate system, the point of interest being selected by a user on an electronic topographic map, the method including the following steps:
   (a) retrieving an actual location of the point of interest relative to the three dimensional coordinate system from a topographic map database;
   (b) identifying one or more cameras located proximal to the point of interest;
   (c) for each proximal camera retrieving a camera location relative to the three dimensional coordinate system;
   (d) querying the topographic map database to retrieve coordinates including a topographic elevation value located on the topographic map along a camera heading between the camera and the point of interest;

(e) for each proximal camera computing a series of theoretical coordinates including a theoretical elevation value located along a camera trajectory between the camera and the point of interest;

(f) comparing the topographic elevation values with the theoretical elevation values;

wherein a clear view of the point of interest is available from the camera only when a theoretical elevation value is greater than or equal to the topographic elevation values; and (g) repeating steps (d) to (f) for each proximal camera to identify those proximal cameras from which a clear view of the point of interest is available.

10. A method according to claim 9, wherein the method further includes the steps of computing a camera position including a camera heading and a camera tilt for camera providing an optimal view of a point of interest and transmitting the required camera position to the camera to cause the camera to move from an initial camera position to a required camera position wherein the point of interest is within a camera view of the camera.

11. A method according to claim 9, wherein if a clear view to the point of interest is available from more than one proximal camera, the camera located closest to the point of interest may be selected for viewing the location of the point of interest.

12. A method according to claim 9, wherein if a clear view to the point of interest is not available from a proximal camera, the camera providing a clear view to an alternative point closest to the point of interest is selected.

13. A system for approximating the location of a point of interest relative to a three dimensional coordinate system, the system including:

(a) a camera to be orientated towards the point of interest such that a user can view the point of interest in a camera view;

(b) a first database for storing camera data including a camera location relative to the three dimensional coordinate system, and a camera orientation including a camera heading and a camera tilt;

(c) a second database for storing topographic map data;

(d) a processor for identifying a plurality of sets of three dimensional coordinates located on the topographic map along the camera heading to form a first dataset and computing a plurality of sets of three dimensional coordinates located on a camera trajectory between the camera and the point of interest at predetermined regular intervals along the camera trajectory based on the camera heading and camera tilt to form a second dataset;

wherein a comparison of the first dataset with the second dataset identifies a pair of matching sets of three dimensional coordinates which represent the three dimensional coordinate location of the point of interest; and (e) a verification module for verifying the three dimensional coordinate location of a point of interest using difference in elevation between the camera location and the point of interest location to validate the camera tilt;

wherein if the camera tilt is validated within acceptance tolerances, the position of the three dimensional coordinate location of the point of interest is verified.

14. A system according to claim 13, further including a topographic map interface on which the location of the three dimensional coordinates corresponding to the point of interest are indicated to the user.

15. A system for approximating the location of a point of interest relative to a three dimensional coordinate system, the system comprising a processor and associated memory device for storing a series of instructions to cause the processor to carry out a method according to claim 1.

16. Computer software for use in a system for approximating the location of a point of interest relative to a three dimensional coordinate system, the system comprising a processor and associated memory device for storing the computer software including a series of instructions to cause the processor to carry out a method according to claim 1.

17. A method according to claim 6, further including the step of determining a difference in height or altitude and a horizontal distance between the camera location and each point defining the polygon to enable verification of the three dimensional coordinate location of each point defining the polygon with which the point of interest is located.

* * * * *